United States Patent
Bruinsma et al.

(10) Patent No.: US 7,391,676 B2
(45) Date of Patent: *Jun. 24, 2008

(54) ULTRASONIC DISTANCE SENSORS

(75) Inventors: Anastasius Jacobus Anicetus Bruinsma, Delft (NL); Willem Jurrianus Venema, Eindhoven (NL)

(73) Assignee: ASML Netherlands B.V., Veldhoven (NL)

( * ) Notice: Subject to any disclaimer, the term of this patent is extended or adjusted under 35 U.S.C. 154(b) by 384 days.

This patent is subject to a terminal disclaimer.

(21) Appl. No.: 11/018,926

(22) Filed: Dec. 22, 2004

(65) Prior Publication Data

US 2006/0133209 A1 Jun. 22, 2006

(51) Int. Cl.
*G01S 15/02* (2006.01)
*G01N 29/00* (2006.01)

(52) U.S. Cl. .............................. 367/99; 73/597; 73/627; 73/290 V (58) Field of Classification Search ................. 367/99, 367/908; 73/597, 627, 629, 643, 655, 657, 73/290 V
See application file for complete search history.

(56) References Cited

U.S. PATENT DOCUMENTS

| | | | | |
|---|---|---|---|---|
| 4,145,914 A | * | 3/1979 | Newman | 367/99 |
| 4,561,064 A | * | 12/1985 | Bruggen et al. | 367/909 |
| 4,578,997 A | * | 4/1986 | Soltz | 73/290 V |
| 5,226,320 A | * | 7/1993 | Dages et al. | 73/290 V |
| 5,229,872 A | | 7/1993 | Mumola | |
| 5,296,891 A | | 3/1994 | Vogt et al. | |
| 5,500,736 A | | 3/1996 | Koitabashi et al. | |
| 5,523,193 A | | 6/1996 | Nelson | |
| 5,530,482 A | | 6/1996 | Gove et al. | |
| 5,579,147 A | | 11/1996 | Mori et al. | |
| 5,677,703 A | | 10/1997 | Bhuva et al. | |
| 5,808,797 A | | 9/1998 | Bloom et al. | |
| 5,982,553 A | | 11/1999 | Bloom et al. | |
| 6,133,986 A | | 10/2000 | Johnson | |
| 6,177,980 B1 | | 1/2001 | Johnson | |
| 6,687,041 B1 | | 2/2004 | Sandstrom | |
| 6,747,783 B1 | | 6/2004 | Sandstrom | |
| 6,795,169 B2 | | 9/2004 | Tanaka et al. | |
| 6,806,897 B2 | | 10/2004 | Kataoka et al. | |
| 6,811,953 B2 | | 11/2004 | Hatada et al. | |
| 7,148,494 B2 | * | 12/2006 | Bruinsma et al. | 250/491.1 |
| 2004/0041104 A1 | | 3/2004 | Liebregts et al. | |
| 2004/0130561 A1 | | 7/2004 | Jain | |
| 2005/0007572 A1 | | 1/2005 | George et al. | |

FOREIGN PATENT DOCUMENTS

WO WO 98/33096 7/1998
WO WO 98/38597 9/1998

* cited by examiner

*Primary Examiner*—Ian J Lobo
(74) *Attorney, Agent, or Firm*—Sterne, Kessler, Goldstein & Fox P.L.L.C.

(57) ABSTRACT

A lithographic apparatus comprises an illumination system, a support constructed to support a patterning device, and a projection system. In pixel grid imaging, a large number of small optical spots are imaged onto the substrate surface using a micro-lens array (MLA). The z position of the MLA is adjustable in order to focus the spots on the substrate surface and/or to compensate for differences in height of the substrate surface. The focusing adjustment is based on an output of an ultrasonic distance sensor provided in the vicinity of the substrate surface.

21 Claims, 5 Drawing Sheets

ULTRASONIC DISTANCE SENSORS

BACKGROUND

1. Field of the Invention

The present invention relates to ultrasonic distance sensors and is concerned more particularly, but not exclusively, with the use of such ultrasonic distance sensors in lithographic apparatus.

2. Related Art

A lithographic apparatus is a machine that applies a desired pattern onto a substrate, usually onto a target portion of the substrate. A lithographic apparatus can be used, for example, in the manufacture of integrated circuits (ICs). In that instance, a patterning device, which is alternatively referred to as a mask or a reticle, can be used to generate a circuit pattern to be formed on an individual layer of the IC. This pattern can be transferred onto a target portion (e.g., comprising part of, one, or several dies) on a substrate (e.g., a silicon wafer). Transfer of the pattern is typically via imaging onto a layer of radiation-sensitive material (e.g., resist) provided on the substrate. In general, a single substrate will contain a network of adjacent target portions that are successively patterned. Known lithographic apparatus include, steppers, in which each target portion is irradiated by exposing an entire pattern onto the target portion at one time, and scanners, in which each target portion is irradiated by scanning the pattern through a radiation beam in a given direction (the "scanning" direction), while synchronously scanning the substrate parallel or anti-parallel to this direction. It is also possible to transfer the pattern from the patterning device to the substrate by imprinting the pattern onto the substrate.

In maskless lithography it is known to project the patterned beam onto a target portion of the substrate using a projection system that comprises an array of lenses arranged such that each lens receives and focuses a respective portion of the patterned beam. Each lens of the array of lenses thus projects a respective spot of radiation onto the substrate, and the array of lenses collectively projects a radiation pattern on the substrate. In one type of lithography machine, imaging of the resist layer on the substrate is affected using pixel grid imaging. To achieve this, a large number of small optical spots are imaged onto the resist layer using a series of micro-lens arrays (MLA). The z position of each MLA or group of MLA's is adjustable in order to focus the spots on the surface of the substrate. The focusing of the MLA's is adjustable, so as to compensate for differences in height of the substrate surface. Such focusing adjustment of the MLA's can be effected on the basis of the output of level sensors provided in the vicinity of the substrate surface in a feed forward mode. The effectiveness of conventional systems is limited by an accuracy of such distance sensors.

Therefore, what is needed is a system and method using a more effective distance sensor.

SUMMARY

According to one embodiment of the present invention, there is provided an ultrasonic distance sensor for monitoring the height of a substrate surface. The sensor comprises an ultrasonic emitter system, an ultrasonic receiver system, and a signal processor. The ultrasonic emitter system emits a first transmitted beam towards the substrate surface and a second transmitted beam. The ultrasonic receiver system receives a first reflected beam produced by reflection of the first transmitted beam from the substrate surface and a second reflected beam produced by reflection of the second transmitted beam. The signal processor processes signals received from the ultrasonic emitter system and ultrasonic receiver system indicative of time differences between the emission and receipt of the transmitted and reflected beams in order to monitor the height of the substrate surface.

According to one embodiment of the present invention, there is provided a lithographic apparatus comprising an illumination system, a support, a projection system, and a ultrasonic distance sensor. The illumination system conditions a radiation beam. The support is constructed to support a patterning device. The patterning device patterns the beam. The projection system projects the patterned beam onto a target portion of the substrate. The ultrasonic distance sensor monitors the height of a surface of the substrate, and comprises an ultrasonic emitter system, an ultrasonic receiver system, and a signal processor. The ultrasonic emitter system emits a first transmitted beam towards the substrate surface and a second transmitted beam. The ultrasonic receiver system receives a first reflected beam produced by reflection of the first transmitted beam from the substrate surface and a second reflected beam produced by reflection of the second transmitted beam. The signal processor processes signals received from the ultrasonic emitter system and the ultrasonic receiver system indicative of the time differences between the emission and receipt of the transmitted and reflected beams in order to monitor the height of the substrate surface.

According one embodiment of the present invention there is provided a method of monitoring the height of a substrate surface comprising the following steps. Emitting a first ultrasonic transmitted beam towards the substrate surface. Emitting a second ultrasonic transmitted beam. Receiving a first reflected beam produced by reflection of the first transmitted beam from the substrate surface. Receiving a second reflected beam produced by reflection of the second transmitted beam. Processing signals indicative of the time differences between the emission and receipt of the transmitted and reflected beams in order to monitor the height of the substrate surface.

According to one embodiment of the present invention, there is provided a device manufacturing method comprising the following steps. Transferring a pattern from a patterning device onto a surface of a substrate, while adjusting the focusing of the image of the pattern in dependence on variation in the height of the substrate surface. The height of the substrate surface is monitored by the following method. Emitting a first ultrasonic transmitted beam towards the substrate surface. Emitting a second ultrasonic transmitted beam. Receiving a first reflected beam produced by reflection of the first transmitted beam from the substrate surface. Receiving a second reflected beam produced by reflection of the second transmitted beam. Processing signals indicative of the time differences between the emission and receipt of the transmitted and reflected beams in order to monitor the height of the substrate surface.

Further embodiments, features, and advantages of the present inventions, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate one or more embodiments of the present invention and, together with the description, further serve to explain the principles of the invention and to enable a person skilled in the pertinent art to make and use the invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE DRAWINGS

Figure 1:
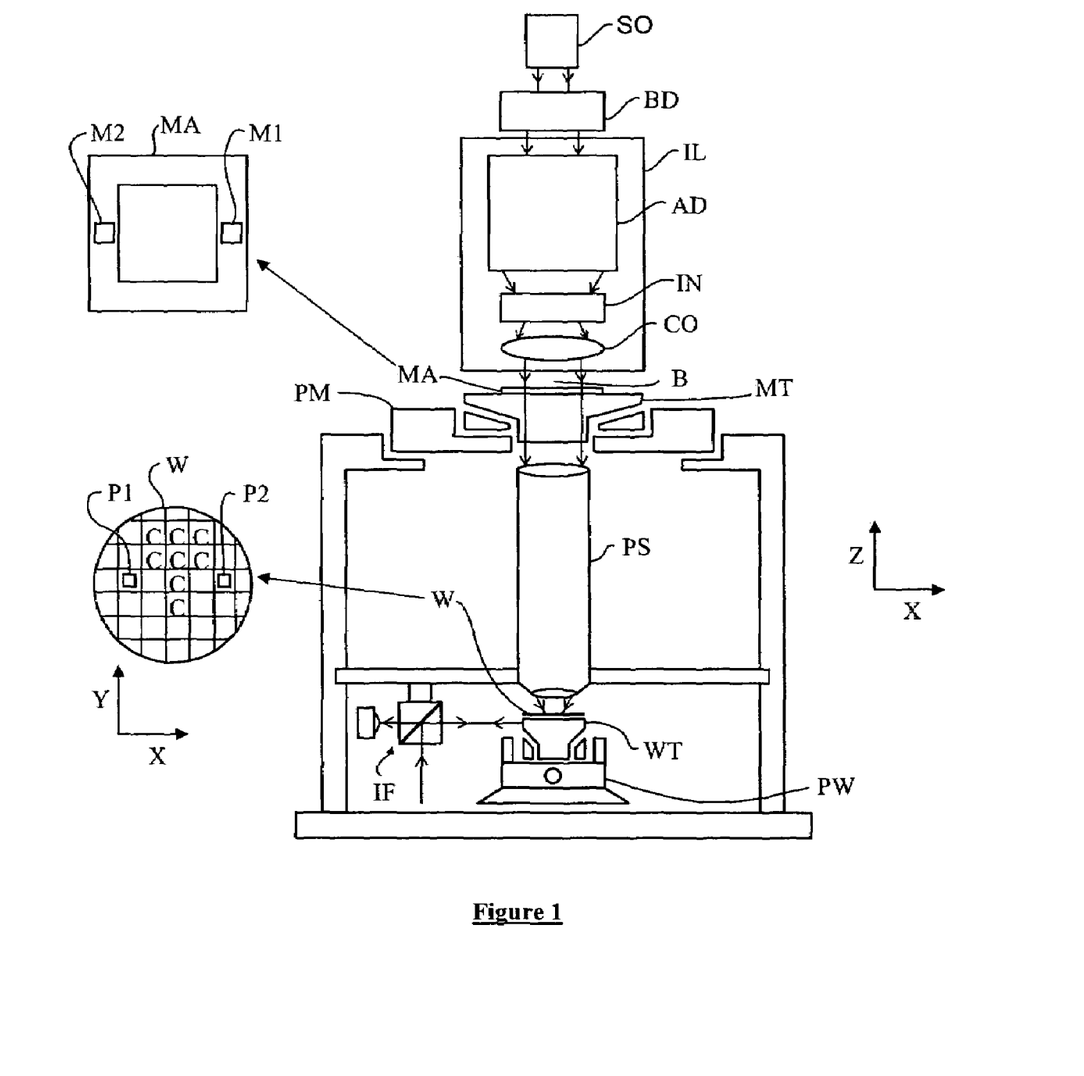
FIG. 1 depicts a lithographic apparatus, according to one embodiment of the present invention.

FIG. 1 schematically depicts a lithographic apparatus, according to one embodiment of the present invention. The apparatus comprises an illumination system (illuminator) IL, a support structure (e.g., a mask table) MT, a substrate table (e.g., a wafer table) WT, and a projection system (e.g., a refractive projection lens system) PS. The illumination system IL conditions a radiation beam B (e.g., UV radiation or white light). The support structure MT is constructed to support a patterning device (e.g., a mask) MA and connected to a first positioner PM that accurately positions the patterning device in accordance with certain parameters. The substrate table WT holds a substrate (e.g., a resist-coated wafer) W and is connected to a second positioner PW that accurately positions the substrate in accordance with certain parameters. The projection system PS projects a pattern imparted to the radiation beam B by patterning device MA onto a target portion C (e.g., comprising one or more dies) of the substrate W.

The illumination system can include various types of optical components, such as refractive, reflective, magnetic, electromagnetic, electrostatic or other types of optical components, or any combination thereof, for directing, shaping, or controlling radiation.

The support structure supports, i.e., bears the weight of, the patterning device. It holds the patterning device in a manner that depends on the orientation of the patterning device, the design of the lithographic apparatus, and other conditions, for example, whether or not the patterning device is held in a vacuum environment. The support structure can use mechanical, vacuum, electrostatic or other clamping techniques to hold the patterning device. The support structure can be a frame or a table, for example, which can be fixed or movable as required. The support structure can ensure that the patterning device is at a desired position, for example with respect to the projection system. Any use of the terms "reticle" or "mask" herein can be considered synonymous with the more general term "patterning device."

The term "patterning device" used herein should be broadly interpreted as referring to any device that can be used to impart a radiation beam with a pattern in its cross-section, such as to create a pattern in a target portion of the substrate. This can include any static or dynamic patterning device, as would become apparent to one of ordinary skill in the art upon reading this description.

In one example, the pattern imparted to the radiation beam may not exactly correspond to the desired pattern in the target portion of the substrate. For example, if the pattern includes phase-shifting features or assist features. Generally, the pattern imparted to the radiation beam will correspond to a particular functional layer in a device being created in the target portion, such as an integrated circuit.

In various examples, the patterning device can be transmissive or reflective. Examples of patterning devices include, but are not limited to, masks, programmable mirror arrays, grating light valves, programmable LCD panels, and the like. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam which is reflected by the mirror matrix.

In various example, the term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein can be considered as synonymous with the more general term "projection system".

In one example, the apparatus is of a transmissive type (e.g., employing a transmissive mask). Alternatively, the apparatus can be of a reflective type (e.g., employing a programmable mirror array of a type as referred to above, or employing a reflective mask).

In various examples, the lithographic apparatus can be of a type having two (dual stage) or more substrate tables (and/or two or more mask tables). In such "multiple stage" machines, the additional tables can be used in parallel, or preparatory steps can be carried out on one or more tables, while one or more other tables are being used for exposure.

In one example, the lithographic apparatus can also be of a type wherein at least a portion of the substrate can be covered by a liquid having a relatively high refractive index, e.g., water, so as to fill a space between the projection system and the substrate. An immersion liquid can also be applied to other spaces in the lithographic apparatus, for example, between the mask and the projection system. Immersion techniques are well known in the art for increasing the numerical aperture of projection systems. The term "immersion" as used herein does not mean that a structure, such as a substrate, must be submerged in liquid, but rather only means that liquid is located between the projection system and the substrate during exposure.

Referring to FIG. 1, the illuminator IL receives a radiation beam from a radiation source SO. The source and the lithographic apparatus can be separate entities, for example when the source is an excimer laser. In such cases, the source is not considered to form part of the lithographic apparatus and the radiation beam is passed from the source SO to the illuminator IL with the aid of a beam delivery system BD comprising, for example, suitable directing mirrors and/or a beam expander. In other cases the source can be an integral part of the lithographic apparatus, for example when the source is a mercury lamp. The source SO and the illuminator IL, together with the beam delivery system BD if required, can be referred to as a radiation system.

The illuminator IL can comprise an adjuster AD for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL can comprise various other components, such as an integrator IN and a condenser CO. The illuminator can be used to condition the radiation beam, to have a desired uniformity and intensity distribution in its cross-section.

The radiation beam B is incident on the patterning device (e.g., mask MA), which is held on the support structure (e.g., mask table MT), and is patterned by the patterning device. Having traversed the mask MA, the radiation beam B passes through the projection system PS, which focuses the beam onto a target portion C of the substrate W.

With the aid of the second positioner PW and position sensor IF (e.g., an interferometric device, linear encoder or capacitive sensor), the substrate table WT can be moved accurately, e.g., so as to position different target portions C in the path of the radiation beam B. Similarly, the first positioner PM and another position sensor (which is not explicitly depicted in FIG. 1) can be used to accurately position the mask MA with respect to the path of the radiation beam B, e.g., after mechanical retrieval from a mask library, or during a scan.

In general, movement of the mask table MT can be realized with the aid of a long-stroke module (coarse positioning) and a short-stroke module (fine positioning), which form part of the first positioner PM. Similarly, movement of the substrate table WT can be realized using a long-stroke module and a short-stroke module, which form part of the second positioner PW.

In the case of a stepper (as opposed to a scanner), the mask table MT can be connected to a short-stroke actuator only, or can be fixed.

In one example, mask MA and substrate W can be aligned using mask alignment marks M1, M2 and substrate alignment marks P1, P2. Although the substrate alignment marks as illustrated occupy dedicated target portions, they can be located in spaces between target portions (these are known as scribe-lane alignment marks). Similarly, in situations in which more than one die is provided on the mask MA, the mask alignment marks can be located between the dies.

The depicted apparatus could be used in at least one of the following modes:

1. In step mode, the mask table MT and the substrate table WT are kept essentially stationary, while an entire pattern imparted to the radiation beam is projected onto a target portion C at one time (i.e., a single static exposure). The substrate table WT is then shifted in the X and/or Y direction so that a different target portion C can be exposed. In step mode, the maximum size of the exposure field limits the size of the target portion C imaged in a single static exposure.

2. In scan mode, the mask table MT and the substrate table WT are scanned synchronously while a pattern imparted to the radiation beam is projected onto a target portion C (i.e., a single dynamic exposure). The velocity and direction of the substrate table WT relative to the mask table MT can be determined by the (de-)magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.

3. In another mode, the mask table MT is kept essentially stationary holding a programmable patterning device, and the substrate table WT is moved or scanned, while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Pixel Grid Imaging Mode: the pattern formed on a substrate is realized by subsequent exposure of spots formed by a spot generator that are directed onto a patterning array. The exposed spots have substantially a same shape. On substrate the spots are printed in substantially a grid. In one example, the spot size is larger than a pitch of a printed pixel grid, but much smaller than the exposure spot grid. By varying intensity of the spots printed, a pattern is realized. In between the exposure flashes the intensity distribution over the spots is varied.

Combinations and/or variations on the above described modes of use or entirely different modes of use can also be employed.

In one example, the lithographic machine is used in the manufacture of flat panel displays. In this example, the lithographic apparatus projects an image of a mask onto a photosensitive resist layer on the upper surface of a substrate. In one example, the image is exposed using pixel grid imaging using a series of MLA's, the z position of which can be adjusted in order to focus the optical spots on the resist layer.

In this example, The image plane should coincide with the resist layer on the substrate (or, in other words, the resist should be in focus) in order to transfer the smallest details (about $\lambda/NA$, where $\lambda$ is the wavelength of the illuminating radiation and NA is the numerical aperture of the lens system) on the mask that are reproducible with the optical design. If the resist layer is out of focus, the image will be blurred.

As regards the range over which the image is sharp, the depth of focus (about $\lambda/NA^2$) is small in a typical UV lithography machine (e.g., a wavelength $\lambda=350$ nm, numerical aperture NA=0.2, and depth of focus about 9 μm). As the flatness of the stage, and the thickness of the substrate will vary more than the typical depth of focus, the position of the substrate or the image plane have to be adjusted during an exposure to compensate for variation in the height of the substrate surface (that is the upper surface of the resist layer on the substrate). In order for such adjustment to be effected it is necessary to measure the position of the image plane and the height map of the substrate. The level sensor (LS) measures the height map of the substrate on the stage.

Height maps can be measured with distance sensors based on various principles. In one example, the sensor is based on measuring the time-of-flight of an ultrasound pulse that is generated by a transducer, travels to the resist layer on the substrate, is reflected at the surface of the resist layer, and then travels back to the transducer where it is detected.

If the distance between the transducer and the upper surface of the resist layer is h, the time-of-flight t will be given by:

$$t=2*h/vsound \text{ where vsound is the sound velocity}$$

Thus, if t is measured, and vsound is known, it is possible to calculate h.

In theory the ultrasound pulse will not only reflect on the resist surface, but also at the upper and lower surfaces of the substrate itself. The reflection coefficient of a sound wave when going from a first medium having an acoustic impedance RA 1 to a second medium having an acoustic impedance RA 2 is:

$$(RA1-RA2)^2/(RA1+RA2)^2$$

For example, see section 6.7 in "The Measurement, Instrumentation and Sensors Handbook", John G. Webster, CRC Press 1999 ISBN 0-8493-8347-1, which is incorporated by reference herein in its entirety.

The acoustic impedance RA is given by $\rho*vsound$, where $\rho$ is the specific density of the medium through which the acoustic wave travels and vsound is the sound velocity in the medium (air, liquid or solid). For air the acoustic impedance RA about 300, whereas, for liquids and solids, the acoustic impedance RA is about $1.5*10^6$, so that the sound wave is almost completely reflected by the air-to-resist transition, so that only the distance between the transducer and the resist surface is measured.

The distance h between the transducer and the resist surface can be calculated from the time-of-flight t using the expression:

$h=v\text{sound}/t$ if the sound velocity in air vsound is known.

The sound velocity depends on the air density that in turn depends on the relative humidity, the pressure and the temperature of the air and the frequency of the ultrasound.

Although vsound can be calculated if the air density is known, a simpler solution is for a reference measurement to be performed by the ultrasonic sensor in addition to the measurement in relation to the resist surface. In this case, the reference measurement uses the same transducer frequency as the other measurement, and the reference measurement is done close to the other measurement so that the air through which the two measurements are made has the same properties.

Exemplary Ultrasonic Distance Sensors

Figure 2:
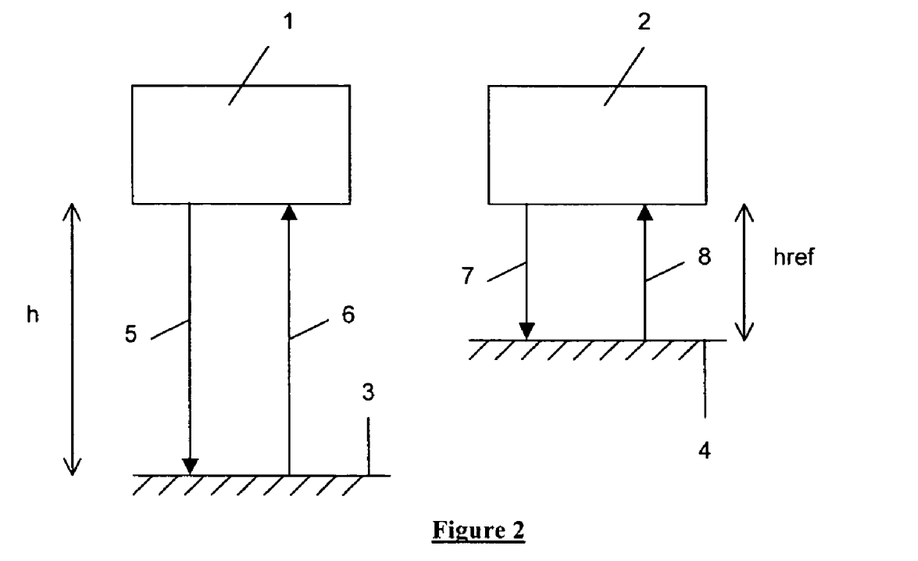
FIGS. 2, 3, 4 and 5 show ultrasonic distance sensors, according to various embodiments of the present invention.

FIG. 2 shows an ultrasonic distance sensor, according to one embodiment of the present invention. The system includes a first transducer 1 for emitting a first transmitted beam 5 towards the substrate surface 3 (the upper surface of the resist layer) and a second transducer 2, immediately adjacent to the first transducer 1, for emitting a second transmitted beam 7 towards a reference surface 4. The first transmitted beam 5 is reflected from the substrate surface 3, such that the beam 6 reflected from the surface 3 is transmitted back towards the first transducer 1. The second transmitted beam 7 is reflected from the reference surface 4, such that the beam 8 reflected from the surface 4 is transmitted back towards the second transducer 2. The first transducer 1 detects receipt of the beam 6, and the second transducer 2 detects receipt of the beam 8. A signal processor (not shown) is provided for processing signals received from the first transducer 1 and the second transducer 2 indicative of the times-of-flight t1 and t2 between the emission and receipt of the transmitted and reflected beams 5, 6 and 7, 8 in order to monitor the height of the substrate surface 3 in the manner described below.

The first transducer 1 measures the time-of-flight t1 between the transducer 1 and the substrate surface 3 and the second transducer 2 measures the time-of-flight t2 between the transducer 2 and the reference surface 4, both measurements being made through air with the same composition. If the distance href between the second transducer 2 and the reference surface 4 is known, it therefore follows that vsound can be calculated from the expression:

$v\text{sound}=(h\text{ref}/2)/t2$ so that the distance h to be measured between the first transducer 1 and the substrate surface 3 can be calculated by the signal processor from the expression:

$h=t1*v\text{sound}/2=h\text{ref}*t1/t2$ which is independent of vsound.

Figure 3:
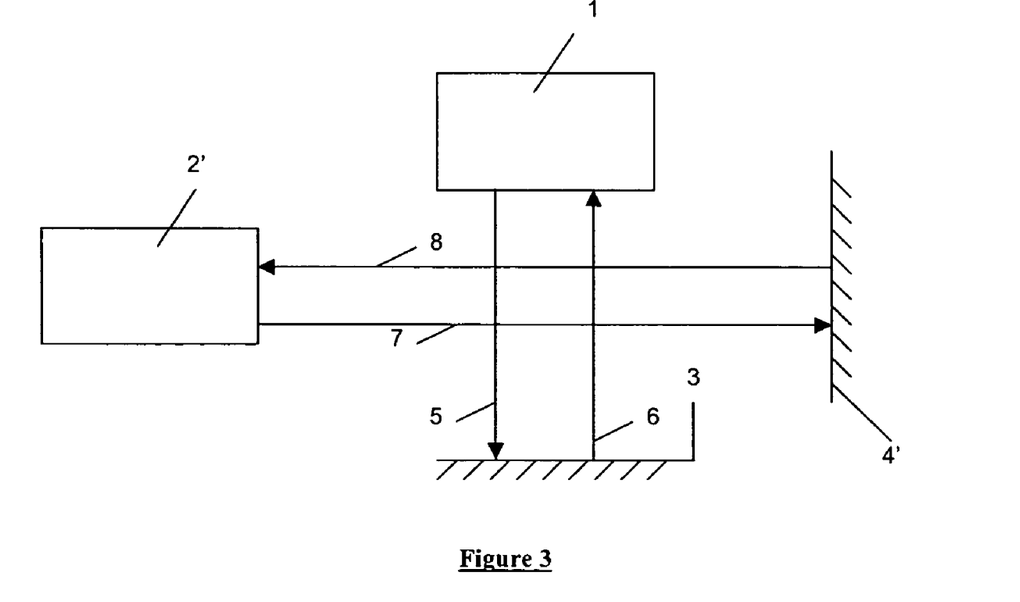

FIG. 3 shows an ultrasonic distance sensor, according to one embodiment of the present invention. In this embodiment, the second transducer 2 and the reference surface 4 are located such that the second transmitted beam 7 transmitted by the second transducer 2 towards the surface 4 and the beam 8 reflected from the surface 4 are transverse to the first transmitted beam 5 transmitted by the first transducer 1 towards the substrate surface 3 and the beam 6 reflected from the surface 3. The measurements are again made through air of substantially the same composition, and the determination of the height h of the substrate surface by the signal processor is undertaken in the same manner as described above FIG. 4 shows an ultrasonic distance sensor, according to one embodiment of the present invention. In this embodiment, the first transducer 1 and the second transducer 2 are mounted with a known height difference d (the distance of the second transducer 2 from the substrate surface 3 not being known). The signal processor determines the distance h between the first transducer 1 and the substrate surface 3 from the signals received from the first transducer 1 and the second transducer 2 indicative of the times-of-flight t1 and t2 between the emission and receipt of the transmitted and reflected beams 5, 6 and 7, 8 in a rather different manner, the reflected beams 6 and 8 both being reflected from the substrate surface 3 in this case.

Figure 4:
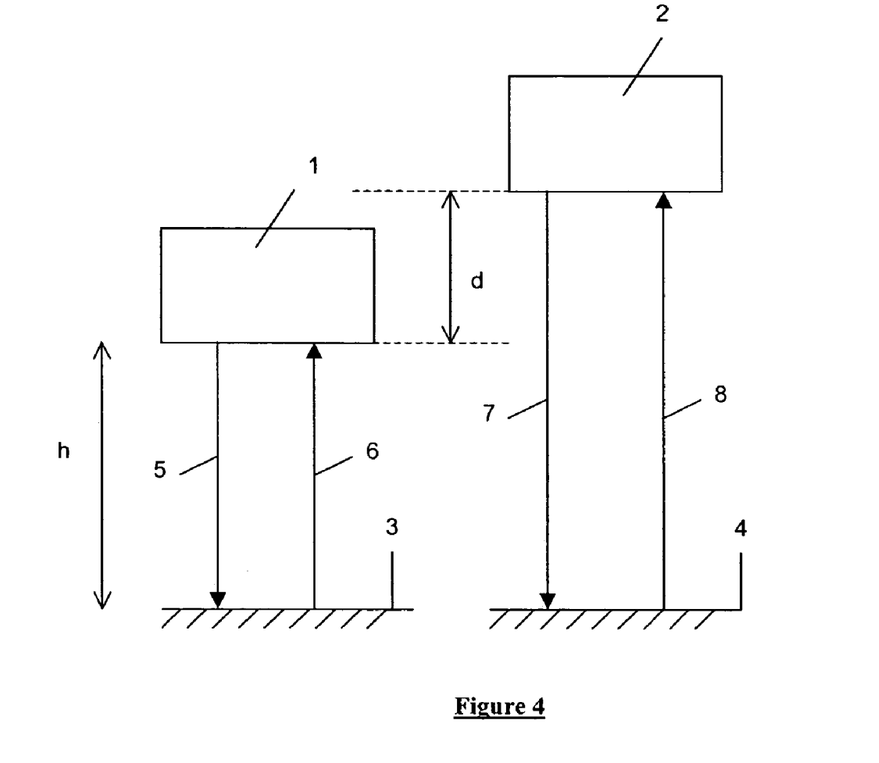

In this embodiment, the time-of-flight t1 between the transducer 1 and the surface 3 is given by $t1=2*h/v\text{sound}$, and the time-of-flight t2 between the transducer 2 and the surface 3 is given by $t2=2*(h+d)/v\text{sound}$, from which $v\text{sound}=2d/(t2-t1)$, so that the distance h to be measured between the first transducer 1 and the substrate surface 3 can be calculated by the signal processor from the expression:

$h=d*t1/(t2-t1)$ which is independent of vsound.

In this embodiment, the height difference d is known. For example, d may be known by mounting the transducers 1 and 2 at a measured distance apart. Alternatively, the height difference d can be determined by a calibration step in which the substrate is measured at two different heights h and h+dh with the difference dh between these heights being known. In this calibration step the signal processor calculates the height measurements d and d+dh between the first transducer 1 and the substrate surface 3 for these two different heights from the measured times-of-flight t1 and t2 with the substrate at height h and the measured times-of-flight t1' and t2' with the substrate at height h+dh using the expressions:

$h=d*t1/(t2-t1)$ $h+dh=d*t1'/(t2'-t1')$ from which d can be calculated.

Figure 5:
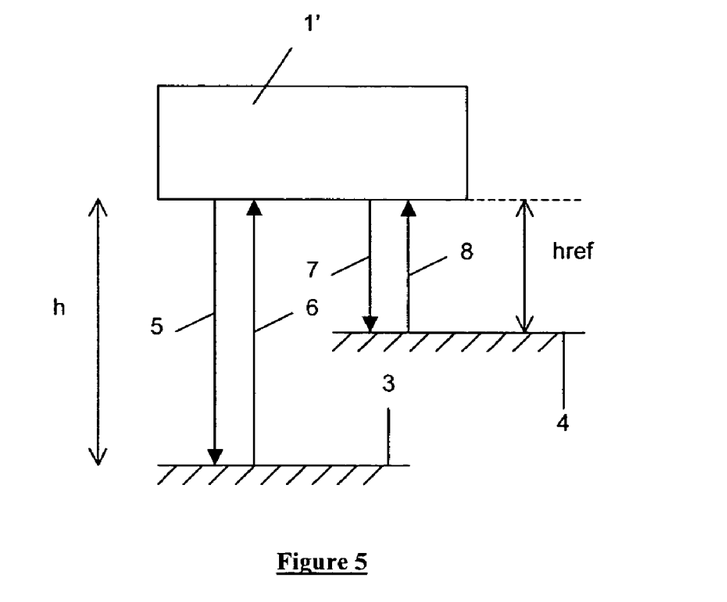

FIG. 5 shows an ultrasonic distance sensor, according to one embodiment of the present invention. In this embodiment, only a single transducer 1' is used for measurement of the times-of-flight t1 and t2 between the emission and receipt of the transmitted and reflected beams 5, 6 and 7, 8. The ultrasonic beam travelling from the transducer 1' to the substrate surface 3 should have a certain diameter, so as to make it possible for parts of the beam to be reflected by the reference surface 4 and by the substrate surface 3. When the signal processor processes the reflected sound wave, the travel time ts of the part of the beam reflected by the substrate surface 3 and the travel time tr of the part of the beam reflected by the reference surface 4 can be distinguished.

In this case:

$ts=2*h/v\text{sound}$ $tr=2*h\text{ref}/v\text{sound}$ from which can be derived the expression to be used by the signal processor:

$h=h\text{ref}*(ts/tr)$ which is independent of vsound.

Figure 6:
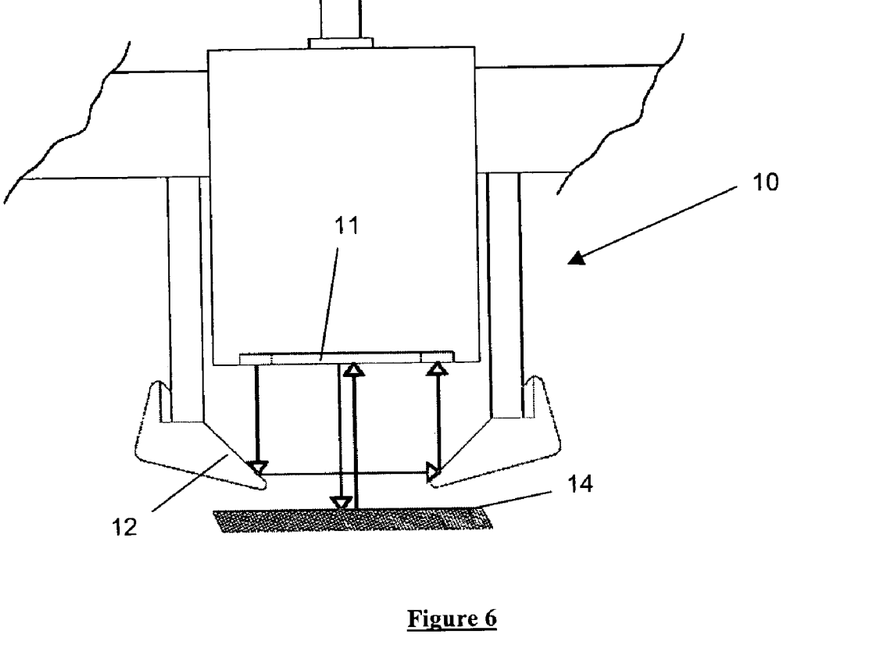
FIG. 6 is a diagram of a layout, according to one embodiment of the present invention.

FIG. 6 shows an ultrasonic distance sensor 10, according to one embodiment of the present invention. In this embodiment, a single transducer is used for carrying out the sensing technique as just described with reference to FIG. 5. In this case, the ultrasonic beam from the transducer 11 is partially reflected from a reference reflector 12 positioned at a known distance from the transducer 11, and partly passes the reflector 12 to be reflected from the resist layer at the surface 14 of the substrate. The transducer 11 receives two echoes, one from the reference reflector 12 and one from the substrate surface 14, and the travel times tr and ts at which these echoes are received at the transducer can be used as shown above to determine the height of the resist surface whilst compensating for temperature and humidity variations of the air between the transducer and the substrate.

In one example, utilizing only one transducer can allow for a cost savings as a result of the fact that only one transducer is required. However, in order to have room for the reference reflector, the transducer is spaced from the substrate surface at a greater distance (a few mm greater) than the arrangements in which two transducers are used.

In one example, using two transducers allows for errors due to process dependent behavior of the sensing arrangement to be cancelled out as they will be the same for both transducers. However, both transducers need to measure at the same part of the substrate so that the transducers have to be placed one behind the other in the scanning direction.

In one example, for high accuracy a high frequency ultrasonic transducer is used with a good coupling efficiency to air. The transducer has a wide bandwidth to achieve a good pulse response, allowing accurate travel time measurement as well as minor ringing to allow a short measuring range and high pulse repetition rates. Generally commercially available ultrasonic distance measurement systems use narrowband transducers that are not suitable for the required application. For maximum resolution, the optimum center frequency of the required transducer should be as high as possible, at least a few hundred kHz. However, at high frequencies, air absorption increases dramatically, for example from about 160 dB/m at 1 MHz to over about 2000 dB/m at 4 MHz. This corresponds to a greater than about 20 dB return loss at about 10 mm, corresponding to the minimum free working range of about 5 mm. The maximum transducer center frequency is thus limited to about 4 MHz.

The transducer aperture (active diameter) affects the beam shape, as well as the transducer footprint on the substrate, that is the area over which the distance is averaged. In one example, a pencil beam with negligible beam spreading is used, if this allows sufficient spatial resolution.

Figure 7:
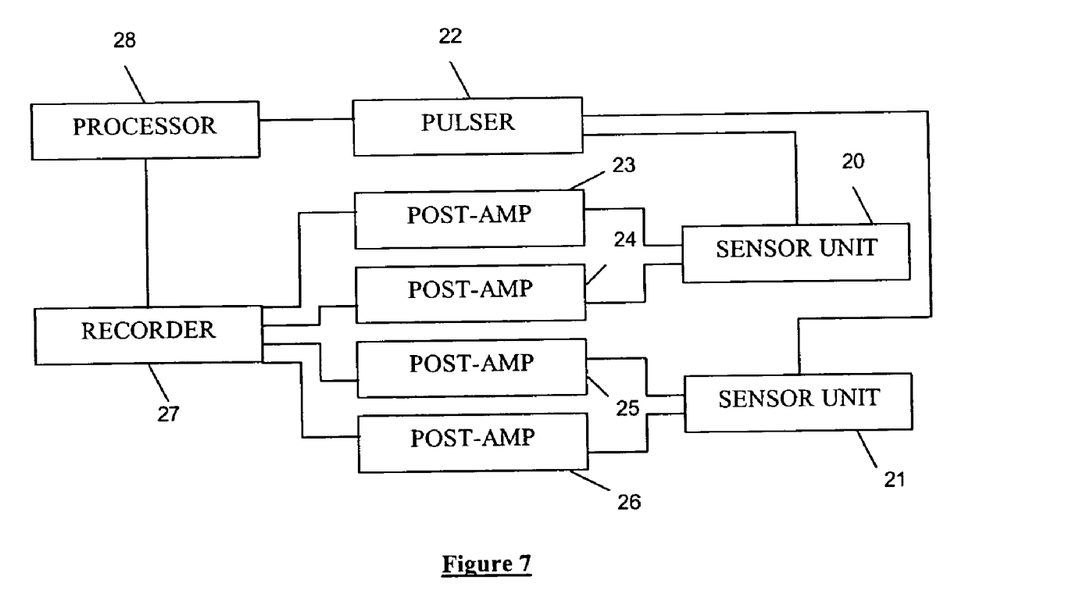
FIGS. 7 and 8 are diagrams of possible control arrangements, according to one embodiment of the present invention.

FIG. 7 is a block diagram of the electronic circuitry associated with a distance sensing arrangement, according to one embodiment of the present invention. A sensing arrangement comprises dual sensor units 20 and 21, each unit containing two individual ultrasonic transducers and associated front-end electronics. In one example, each sensor unit contains two piezoelectric transducers each with a pre-amplifier/limiter unit. The two transducers are offset in the vertical direction by a calibrated amount, so as to allow the determination of the sound speed by the difference in travel time between the two transducers. The sensor units 20 and 21 are connected by a cable to a central electronics unit containing a shared ultrasonic pulser 22, which supplies triggering pulses to the sensor units, and post amplifier/filter units 23, 24, 25 and 26 for the different transducers.

The outputs of the post amplifier/filter units 23, 24, 25 and 26 are supplied to the channels of a four-channel high frequency transient recorder 27 (e.g., an analog-to digital (A/D) converter and memory). A microprocessor 28 controls the measuring process and communicates with the remainder of the lithographic machine in dependence on the measurement results received by the recorder 27. For each sensor head, the sensing arrangement runs two individual, independent processes, namely the measurement process carrying out data acquisition and analysis, and the communication process which handles the interface with the main machine, including input of control parameters and output of measurement data.

Figure 8:
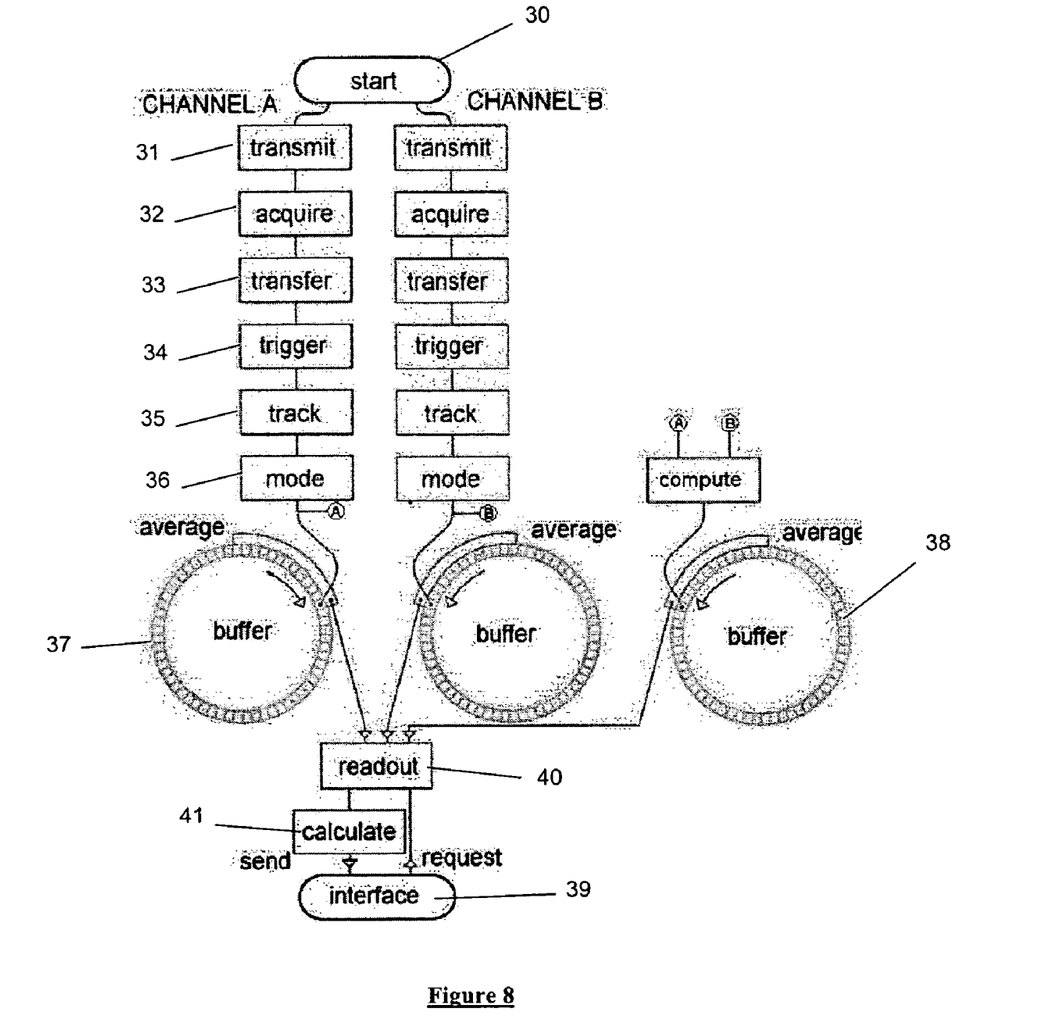

FIG. 8 shows a measuring process for a single sensor head, according to one embodiment of the present invention. A data acquisition/measuring process starts with a start routine 30 followed by, for each of the two channels A and B corresponding to the two transducers, a transmit routine 31 in which the pulser generates an electronic transmit pulse forcing the corresponding transducer to emit a short ultrasonic pulse. At the same time, an acquire routine 32 is triggered to start the transient recorder. After the echo signals received by the transducers have been recorded by the transient recorder (e.g., simultaneously for the two channels), the processor software transfers a selected time window of the results for each channel to memory in a transfer routine 33. This determines in a trigger routine 34 the echo arrival time from the data in the time window. The travel time for each channel is the amount of time elapsed between the start of the transmit pulse and the arrival of the echo (either the first echo or a specific multiple).

Another software algorithm monitors the placement of the window in relation to the travel time correcting it where necessary for the next transmission/reception sequence to provide a track routine 35 for tracking gradual variations in distance and/or sound speed. In a mode routine 36, statistics of the travel time measurements are monitored to set the mode parameter accordingly, namely one of: (i) the initialisation mode entered upon startup in which echoes are looked for in a wide time window and the statistics of the calculated travel time are monitored, (ii) the normal mode which is entered after stable operation has been achieved and in which outliers exceeding about +/−3 σ limits are discarded, and/or (iii) a locking mode which is entered after a selected number of outliers have been detected close together and in which outlier removal is disabled, thus enabling rapid response to steps in measuring distance. Upon completion of the locking process, the system reverts to normal mode.

The measured travel time is entered in a circular buffer 37 (e.g., overwriting data recorded previously), and is also used to recompute the average over the last n samples in the buffer by adding the new value while removing the oldest value. From the travel times for channels A and B from the buffers 37 for the two channels, the sound speed is computed and stored in a third circular buffer 38. This implementation ensures the availability at any time of the latest measured value, with outliers removed and averaged over the last n measurements, with minimal computational overhead, and with an averaging filter length n anywhere between 1 and the buffer length.

When triggering on the first echo, a value for n of about 20 should be adequate to achieve the required accuracy. As the statistics between channels can differ slightly, depending on the range offset, for example, n can be set separately for each channel and for the sound speed in the third buffer. This facility is especially important for this last case, since the range offset is only a fraction of the individual measuring distances, so that for this buffer it is estimated that n should probably be set to approximately the square of the ratio between the range offset and the individual ranges.

Separately from the data acquisition/measuring process, a distance output process is provided by which, when a request for data is received from a digital interface 39 for the rest of the machine, the most recent values are retrieved by a readout routine 40 from the averages of channels A and B and the sound speed and used in a calculate routine 41 to calculate the ranges for A and B and supply them to the digital interface.

In addition to the ultrasonic transmission and detector electronics, a thermocouple sensor is provided for detecting the air temperature so as to allow for temperature compensation.

Although specific reference can be made in this text to the use of lithographic apparatus in the manufacture of integrated circuits (ICs), it should be understood that the lithographic apparatus described herein can have other applications, such as the manufacture of integrated optical systems, guidance and detection patterns for magnetic domain memories, flat-panel displays, liquid-crystal displays (LCDs), thin-film magnetic heads, etc. The skilled artisan will appreciate that, in the context of such alternative applications, any use of the terms "wafer" or "die" herein can be considered as synonymous with the more general terms "substrate" or "target portion," respectively.

In one example, the substrate referred to herein can be processed, before or after exposure, in for example a track (a tool that typically applies a layer of resist to a substrate and develops the exposed resist), a metrology tool and/or an inspection tool. Where applicable, the disclosure herein can be applied to such and other substrate processing tools. Further, the substrate can be processed more than once, for example in order to create a multi-layer IC, so that the term substrate used herein can also refer to a substrate that already contains multiple processed layers.

Although specific reference can have been made above to the use of embodiments of the invention in the context of optical lithography, it will be appreciated that the invention can be used in other applications, for example imprint lithography, and where the context allows, is not limited to optical lithography. In imprint lithography a topography in a patterning device defines the pattern created on a substrate. The topography of the patterning device can be pressed into a layer of resist supplied to the substrate whereupon the resist is cured by applying electromagnetic radiation, heat, pressure or a combination thereof. The patterning device is moved out of the resist leaving a pattern in it after the resist is cured.

The terms "radiation" and "beam" used herein encompass all types of electromagnetic radiation, including ultraviolet (UV) radiation (e.g., having a wavelength of or about 365, 248, 193, 157 or 126 nm) and extreme ultra-violet (EUV) radiation (e.g., having a wavelength in the range of 5-20 nm), as well as particle beams, such as ion beams or electron beams.

The term "lens", where the context allows, can refer to any one or combination of various types of optical components, including refractive, reflective, magnetic, electromagnetic and electrostatic optical components.

While specific embodiments of the invention have been described above, it will be appreciated that the invention can be practiced otherwise than as described. For example, the invention can take the form of a computer program containing one or more sequences of machine-readable instructions describing a method as disclosed above, or a data storage medium (e.g., semiconductor memory, magnetic or optical disk) having such a computer program stored therein.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A lithographic apparatus comprising:
an illumination system that conditions a radiation beam;
a support that supports a patterning device, the patterning device pattering the beam;
a projection system that projects the patterned beam onto a target portion of a substrate; and
an ultrasonic distance sensor that monitors a height of a surface of the substrate, the sensor comprising,
an ultrasonic emitter system that emits a first transmitted beam towards the substrate surface and a second transmitted beam,
an ultrasonic receiver system that receives a first reflected beam produced by reflection of the first transmitted beam from the substrate surface and a second reflected beam produced by reflection of the second transmitted beam, and
a signal processor that processes signals received from the ultrasonic emitter system and the ultrasonic receiver system indicative of time differences between the emission and the receipt of the transmitted and reflected beams in order to monitor the height of the substrate surface.

2. The sensor of claim 1, wherein the ultrasonic emitter system comprises: a first transducer that emits the first transmitted beam; and a second transducer that emits the second transmitted beam.

3. The sensor of claim 2, wherein the ultrasonic receiver system comprises: the first transducer that receives the first reflected beam; and the second transducer that receives the second reflected beam.

4. The sensor of claim 2, wherein the first and second transducers are located, such that paths of the first and second transmitted beams are adjacent and substantially parallel to one another.

5. The sensor of claim 2, wherein the first and second transducers are located, such that paths of the first and second transmitted beams are mutually transverse to one another.

6. The sensor of claim 2, wherein: the first and second transducers are located a known distance apart; and the signal processor determines a distance of the substrate surface from the sensor from the relationship between, the time difference between emission of the first transmitted beam and receipt of the first reflected beam reflected from the substrate surface, the time difference between emission of the second transmitted beam and receipt of the second reflected beam reflected from the substrate surface, and the known distance apart of the first and second transducers.

7. The sensor of claim 6, wherein the signal processor comprises: a calibration arrangement that determines a distance separating the first and second transducers by monitoring the time differences between the emission of the second transmitted beam and the receipt of the beam reflected from the substrate surface for two different height positions of the second transducer that are a known distance apart.

8. The sensor of claim 1, wherein the ultrasonic emitter system comprises: a single transducer that emits both the first transmitted beam and the second transmitted beam.

9. The sensor of claim 8, wherein the ultrasonic receiver system comprises: the single transducer that receives both the first reflected beam and the second reflected beam.

10. The sensor of claim 1, wherein: a reference surface is located at a known distance from the sensor that reflects the second transmitted beam; and the signal processor determines a distance of the substrate surface from the sensor from the relationship between, the time difference between emission of the first transmitted beam and receipt of the first reflected beam reflected from the substrate surface, the time difference between emission of the second transmitted beam and receipt of the second reflected beam reflected from the reference surface, and the known distance of the reference surface from the sensor.

11. The sensor of claim 1, wherein the ultrasonic emitter system emits the first and second transmitted beams in as ultrasonic pulses.

12. A method of monitoring a height of a substrate surface, comprising:
    emitting a first ultrasonic transmitted beam towards the substrate surface;
    emitting a second ultrasonic transmitted beam;
    receiving a first reflected beam produced by reflection of the first transmitted beam from the substrate surface;
    receiving a second reflected beam produced by reflection of the second transmitted beam; and
    processing signals indicative of time differences between the emission and the receipt of the transmitted and reflected beams in order to monitor the height of the substrate surface.

13. The method of claim 12, further comprising:
    emitting the first transmitted beam from a first transducer; and
    emitting the second transmitted beam from a second transducer.

14. The method of claim 13, further comprising:
    receiving the first reflected beam at the first transducer; and
    receiving the second reflected beam at the second transducer.

15. The method of claim 13, further comprising:
    positioning the first and second transducers a known distance apart; and
    determining a distance of the substrate surface from the sensor a relationship between a time difference between emission of the first transmitted beam and receipt of the first reflected beam reflected from the substrate surface and a time difference between emission of the second transmitted beam and receipt of the second reflected beam reflected from the substrate surface and from the known distance apart of the first and second transducers.

16. The method of claim 15, further comprising:
    a calibration step that determines the distance apart of the first and second transducers by monitoring the time differences between the emission of the second transmitted beam and the receipt of the second reflected beam reflected from the substrate surface for two different height positions of the second transducer that are a known distance apart.

17. The method of claim 12, wherein the paths of the first and second transmitted beams are adjacent and substantially parallel to one another.

18. The method of claim 12, wherein the paths of the first and second transmitted beams are mutually transverse to one another.

19. The method of claim 12, further comprising:
    using a single transducer to emit both the first transmitted beam and the second transmitted beam.

20. The method of claim 19, further comprising:
    receiving the first reflected beam and the second reflected beam using the single transducer.

21. The method of claim 12, further comprising:
    positioning a reference surface at a known distance from the sensor to reflect the second transmitted beam; and
    determining a distance of the substrate surface from the sensor from a relationship between a time difference between emission of the first transmitted beam and receipt of the first reflected beam reflected from the substrate surface and a time difference between emission of the second transmitted beam and receipt of the second reflected beam reflected from the reference surface and from the known distance of the reference surface from the sensor.

* * * * *